(12) United States Patent
Baskinger (10) Patent No.: US 10,818,083 B1
(45) Date of Patent: Oct. 27, 2020

(54) PYRAMID GENERATION VIA DEPTH-FIRST WALK

(71) Applicant: International Business Machines Corporation, Armonk, NY (US)

(72) Inventor: Samuel Richard Baskinger, Deerfield, WI (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 16/398,570

(22) Filed: Apr. 30, 2019

(51) Int. Cl.
*G06T 15/00* (2011.01)
*G06T 17/00* (2006.01)
*G06F 16/901* (2019.01)
*G06F 7/14* (2006.01)

(52) U.S. Cl.
CPC .............. *G06T 17/005* (2013.01); *G06F 7/14* (2013.01); *G06F 16/9027* (2019.01)

(58) Field of Classification Search
CPC ... G06T 15/06; G06T 17/005; G06T 2210/12; G06T 2210/21; G06T 2210/52; G06F 30/327
USPC .......................................................... 345/418
See application file for complete search history.

(56) References Cited

U.S. PATENT DOCUMENTS

| | | | | |
|---|---|---|---|---|
| 6,298,167 B1* | 10/2001 | Martucci | .............. | H04N 19/647 382/248 |
| 7,197,190 B1* | 3/2007 | Andrew | ................ | H04N 19/176 375/E7.047 |
| 7,777,740 B2* | 8/2010 | Lee | .......................... | G06T 19/00 345/420 |
| 9,258,562 B2* | 2/2016 | Zhang | ................... | H04N 19/597 |
| 9,367,203 B1* | 6/2016 | Costello | ................ | G06F 1/1686 |
| 10,158,836 B2* | 12/2018 | Hsieh | .................... | H04N 19/149 |
| 10,334,248 B2* | 6/2019 | Zhang | ................... | H04N 19/126 |
| 10,438,397 B2* | 10/2019 | Howson | ................ | G06T 15/005 |
| 2017/0270146 A1 | 9/2017 | Harrison et al. | | |
| 2018/0089225 A9 | 3/2018 | Sina | | |
| 2018/0300939 A1 | 10/2018 | Benthin et al. | | |

OTHER PUBLICATIONS

Shaffer CA, Samet H. Optimal quadtree construction algorithms. Computer Vision, Graphics, and Image Processing. Mar. 1, 1987;37(3):402-19.*

(Continued)

*Primary Examiner* — Phu K Nguyen
(74) *Attorney, Agent, or Firm* — Nicholas D. Bowman (57) ABSTRACT

A depth-first walk of a tree structure is performed to populate nodes of the tree structure with corresponding merged tiles of a merged data pyramid to be generated during the walk from source tiles. At a first visit of a target node, a source tile from a first source data layer corresponding to the target is fetched and stored in memory as a first source-derived tile corresponding to the target. At a last visit of the target, a resampling on source-derived tiles from a second source data layer stored in memory corresponding to children nodes of the target node is performed to generate and store in memory a second source-derived tile corresponding to the target node. Also, at the last visit of the target, at least the first and second source-derived tiles are merged to generate a merged tile of the merged data pyramid corresponding to the target.

19 Claims, 7 Drawing Sheets

(56) References Cited

OTHER PUBLICATIONS

Fuhrmann DR. Quadtree traversal algorithms for pointer-based and depth-first representations. IEEE transactions on pattern analysis and machine intelligence. Nov. 1988;10(6):955-60.*
Hou F, Huang CH, Lu JY. A Multi-dimensional Data Storage Using Quad-tree and Z-Ordering. InApplied Mechanics and Materials 2013 (vol. 347, pp. 2436-2441). Trans Tech Publications Ltd.*
Scandolo L, Bauszat P, Eisemann E. Merged multiresolution hierarchies for shadow map compression. InComputer Graphics Forum Oct. 2016 (vol. 35, No. 7, pp. 383-390).*
Joshi, Deep Dive Through a Graph: DFS Traversal, Sep. 2017, pp. 1-20.*
Pitts, Breadth-First Traversal of a Tree, 2000, pp. 1-12.*
Toss J, Pahins CA, Raffin B, Comba JL. Packed-Memory Quadtree: A cache-oblivious data structure for visual exploration of streaming spatiotemporal big data. Computers & Graphics. Nov. 1, 2018;76:117-28.*
Pajarola R, Gobbetti E. Survey of semi-regular multiresolution models for interactive terrain rendering. The Visual Computer. Aug. 1, 2007;23(8):583-605.*
Unknown, "gdal_retile.py", printed Feb. 25, 2019, 2 pages, https://www.gdal.org/gdal_retile.html.
Unknown, "Seeding", MapProxy 1.11.0, last updated on Nov. 20, 2017, printed Feb. 25, 2019, 11 pages, https://mapproxy.org/docs/1.11.0/seed.html.
Baskinger et al., "Expression Data Structure Dataset Processing", U.S. Appl. No. 15/943,450, filed Apr. 2, 2018.
Unknown, "Resampling Techniques in GIS", Raster Resampling for Discrete and Continuous Data—How do you decide what interpolation method to use?, Last Updated: Feb. 19, 2018, 6 pages https://gisgeography.com/raster-resampling/.
Unknown, "Mosaic to New Raster", ArcGIS Pro, printed Apr. 30, 2019, 2 pages https://pro.arcgis.com/en/pro-app/tool-reference/data-management/mosaic-to-new-raster.htm.
Unknown, "gdal_merge.py", GDAL, printed Apr. 30, 2019, 2 pages https://www.gdal.org/gdal_merge.html.
Wikipedia, "Depth-first search", From Wikipedia, the free encyclopedia, last edited on Apr. 15, 2019, printed Apr. 30, 2019, 7 pages, https://en.wikipedia.org/wiki/Depth-first_search.
Unknown, "Raster pyramids", ArcMap, printed Apr. 30, 2019, 4 pages http://desktop.arcgis.com/en/arcmap/10.3/manage-data/raster-and-images/raster-pyramids.htm.
Wikipedia, "Quadtree", From Wikipedia, the free encyclopedia, last edited on Feb. 14, 2019, printed Apr. 30, 2019, 11 pages, https://en.wikipedia.org/wiki/Quadtree.

* cited by examiner

PYRAMID GENERATION VIA DEPTH-FIRST WALK

BACKGROUND

The present disclosure relates generally to the field of data processing, and, more particularly, to the generation of merged pyramids of tiled datasets.

Large datasets are becoming increasingly common. This presents new data management challenges. Some of these large datasets can be represented as multidimensional arrays of bits that are organized into tiles. A typical tile includes a two-dimensional array of cells (or, more specifically, pixels when referring to image data), wherein each cell represents an individual unit of data as a floating-point value. Within a given tile, the cells may be arranged in an N×N grid. For example, a tile may include 256×256 floating point values. Other types of tiles, such as those representing three-dimensional datasets or those in which the cells are arranged in non-square grids, are also possible.

SUMMARY

Embodiments of the present disclosure include a method. As part of the method, a depth-first walk of an empty tree structure is performed to populate a plurality of nodes of the tree structure with corresponding merged tiles of a merged data pyramid to be generated during the walk from source tiles of source data layers. At a first in order visit of a target node of the plurality of nodes of the tree structure during the walk, a source tile from a first source data layer corresponding to the target node is fetched and stored in memory as a first source-derived tile corresponding to the target node. At a last visit of the target node during the walk, a resampling on source-derived tiles from a second source data layer stored in memory corresponding to children nodes of the target node is performed to generate and store in memory a second source-derived tile corresponding to the target node. Also, at the last visit of the target node during the walk, at least the first and second source-derived tiles are merged to generate a merged tile of the merged data pyramid corresponding to the target node.

Embodiments of the present disclosure further include a computer program product for generating a merged data pyramid from a plurality of tiled source data layers, wherein the source data layers are each generated from different source data captured by a different set of sensors. The computer program product comprises a computer readable storage medium. The computer readable storage medium has program instructions embodied therewith that are configured, when executed by at least one computer, to cause the at least one computer to perform a method. As part of the method, a depth-first walk of an empty tree structure is performed to populate a plurality of nodes of the tree structure by generating a plurality of tiles of the merged data pyramid corresponding to the plurality of nodes. At a first visit of at least each node of a subtree of the tree structure during the walk, any tiles in the source data layers corresponding to that node are fetched and stored in memory. Also, at the first visit of the at least each node of a subtree of the tree structure during the walk, if that node is the only one of a set of sibling nodes that has been visited so far during the walk and a parent node of that node has at least one corresponding source-derived tile stored in memory, then a resampling on each such source-derived tile corresponding to the parent node is performed to generate and store in memory a source-derived tile of higher resolution corresponding to each node in the set of siblings. At a last visit of the at least each node of the subtree during the walk, for each source data layer from which (i) any children nodes of that node have corresponding source-derived tiles stored in memory and from which (ii) that node does not have a corresponding source-derived tile stored in memory, a resampling on those source-derived tiles from that source data layer corresponding to those children nodes is performed to generate and store and in memory a single source-derived tile of lower resolution from that source data layer corresponding to that node. Also, at the last visit of the at least each node of the subtree during the walk, all of the source-derived tiles stored in memory corresponding to that node are merged to generate a tile of the merged data pyramid corresponding to that node. Also, at the last visit of the at least each node of the subtree during the walk, all of the source-derived tiles stored in memory corresponding to the children nodes of that node are made available for deletion from memory.

Embodiments of the present disclosure further include a system. The system includes a computer readable storage medium and a processor in communication with the computer readable storage medium. The processor is configured to obtain instructions from the computer readable storage medium that cause the processor to perform a method. As part of the method, a depth-first walk of a tree structure is performed in which a plurality of nodes of the tree structure represent merged tiles of a merged data pyramid to be generated during the walk from source tiles of source data layers. At a first in order visit of a target node of the tree structure during the walk, a source tile from a first source data layer corresponding to the target node is fetched and stored in memory as a first source-derived tile corresponding to the target node. Also, at the first in order visit of the target node of the tree structure during the walk, a zoom-in on a source-derived tile from a second source data layer stored in memory corresponding to a parent node of the target node is performed to generate and store in memory a second source-derived tile corresponding to the target node. At a last visit of the target node during the walk, a zoom-out on source-derived tiles from a third source data layer stored in memory corresponding to children nodes of the target node is performed to generate and store and in memory a third source-derived tile corresponding to the target node. Also, at a last visit of the target node during the walk, at least the first, second, and third source-derived tiles are merged to generate a merged tile of the merged data pyramid corresponding to the target node.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the invention.

DETAILED DESCRIPTION

Aspects of the present disclosure relate generally to the field of data processing, and, more particularly, to the generation of merged pyramids (also referred to herein as "merged data pyramids") of tiled data sets. While the present disclosure is not necessarily limited to such applications, various aspects of the disclosure may be appreciated through a discussion of various examples using this context.

As used herein and except where context clearly indicates to the contrary, the term "memory" does not encompass non-volatile storage (storage). This is particularly true in the context of storing tiles to memory as opposed to storing tiles to storage, which are non-overlapping concepts.

In computer science, a pyramid may refer to a data structure that includes multiple data layers with sets of tiles arranged in a grid pattern at each data layer. The data layers are organized such that each data layer is at different level of detail (LOD). For example, in a pyramid having N levels of detail, there are N data layers extending from a data layer at LOD 0, which includes a single tile covering the entire region of interest at a lowest resolution, to a data layer at LOD N−1, which includes a large number of tiles that each cover a small portion of that region at a highest resolution. At each LOD, the tiles in that data layer represent a zoom in of the tiles in a data layer at one LOD below that data layer.

Pyramids are useful in many fields. One such field is geographical information systems (GIS), where a pyramid can be used to represent geospatial data (e.g., in a geographic map) with tiles in the pyramid representing subregions of a geographic region at various levels of detail. By storing the geospatial data in a pyramid format in persistent storage, the data in the subregions can be accessed quickly at a desired level of detail by an end user. For example, if a pyramid is used to store a visual map of the entire United States in a single tile at LOD 0, then a user could quickly retrieve tiles representing a portion of the map covering Michigan at a particular level of detail (e.g., LOD 3) or retrieve other tiles representing another portion of the map covering Detroit at a different level of detail (e.g., LOD 4). That is to say, by storing a geographic map in a pyramid (rather than as a single data layer), subregions of the map can be retrieved at an appropriate resolution through the fetching of the appropriate tiles, rather needing to perform a resource-intensive process to zoom-in on the single data layer at the time of the retrieval request.

Figure 1:
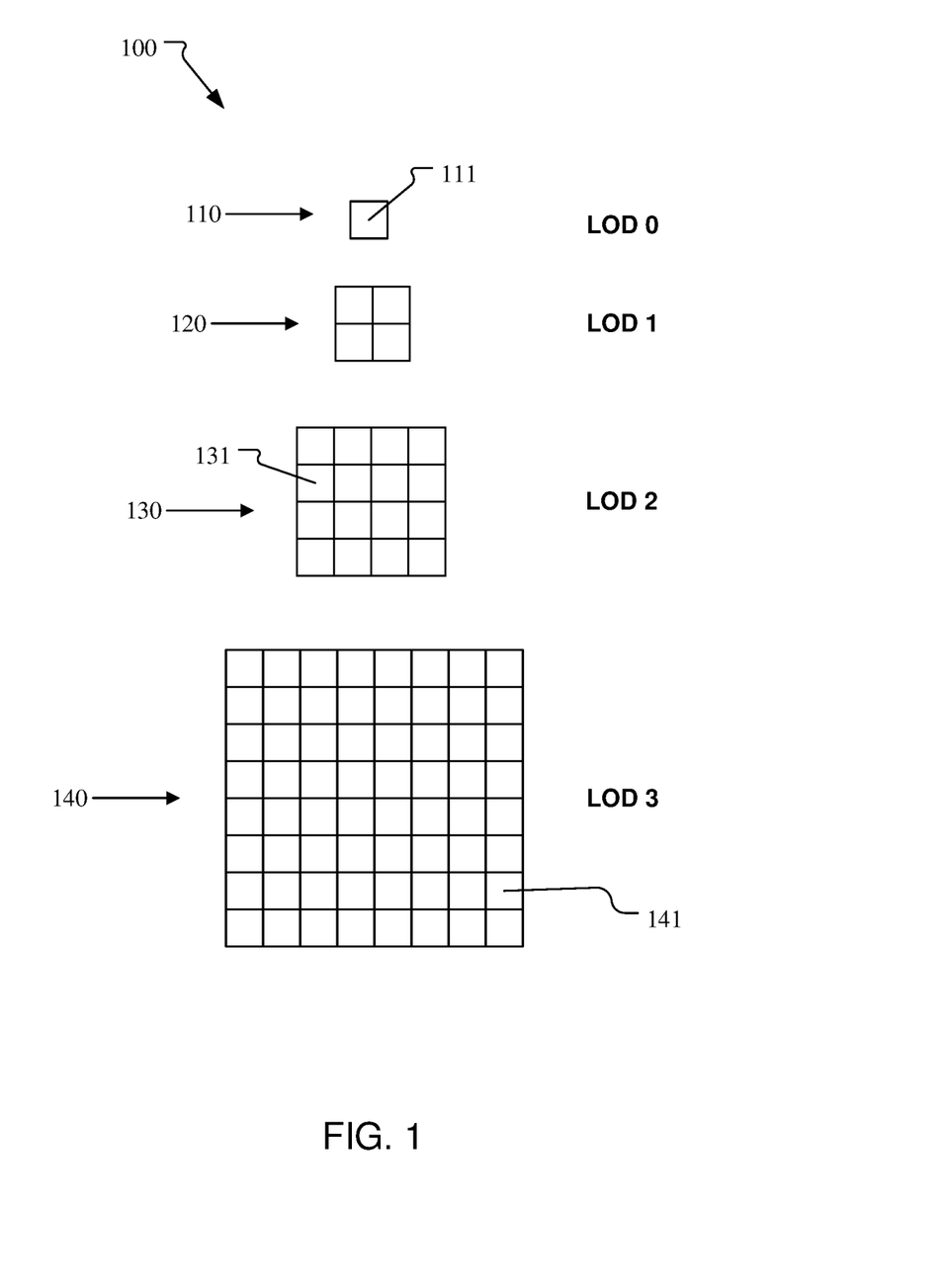
FIG. 1 illustrates a block diagram of an example pyramid 100, in accordance with embodiments of the present disclosure.

Referring now to the figures, shown in FIG. 1 is a block diagram of an example pyramid 100, in accordance with embodiments. As shown, the pyramid 100 has four data layers 110, 120, 130, and 140 at levels of detail 0, 1, 2, and 3, respectively. The pyramid 100 is representable by a quadtree data structure in that each tile at a particular LOD is zoomed out to four tiles (of higher resolution) at the next LOD. That is to say, when a level of detail in pyramid 100 is increased by +1, a number of tiles of data is quadrupled. Because each tile in the pyramid 100 stores the same number of bytes of data (and has the same number of cells), the file size may also be quadrupled at each data layer. In total, the number of tiles at each data layer is $4^{LOD}$ of that data layer, with $2^{LOD}$ tiles left to right and $2^{LOD}$ tiles top to bottom. For example, data layer 130 is at LOD 2, therefore it has 16 tiles arranged in a 4×4 grid.

Each tile of pyramid 100 may include an address to facilitate locating that tile in memory (or persistent storage) and to facilitate reassembly of the pyramid 100. In some embodiments, the addressing scheme may include identifying a tile by its x-coordinate, y-coordinate, and LOD. In this scheme, the x-coordinate may represent the horizontal location of a tile (with 0 being the left-most position) and the y-coordinate may represent the vertical location of the tile (with 0 being the top-most position). For example, using this scheme, tile 111 is addressed as X=0, Y=0, LOD=0; tile 131 is addressed as X=0, Y=1, LOD=2; and tile 141 is addressed as X=7, Y=6, LOD=3.

While an example embodiment of a pyramid 100 is described herein, it is contemplated that many variants of pyramids may be possible. For example, the number of levels of detail in a pyramid may vary significantly (e.g., three or more levels of detail, four or more levels of detail, nine or more levels of detail). For another example, the number of tiles may increase at each LOD in a pyramid by a multiplier other than four (e.g., two, three, or five), such that the pyramid is representable by a tree structure other than a quadtree (e.g., a binary tree or ternary tree). For yet another example, other addressing conventions may be employed to identify the relative locations of the tiles of a pyramid.

In some embodiments, a pyramid is generated as a combination of multiple datasets, with each dataset having a different, discrete source of data. This can pose significant challenges in situations where the sources produce datasets with different native resolutions such that there is not a common level of detail among the datasets. This may occur where different sensors capture data at different resolutions. For example, consider a scenario where precipitation data is captured by different satellites over different continents. In this scenario, the native resolution of data captured over one continent (e.g., North America) is at LOD 9 (e.g., 250-meter by 250-meter tiles), the native resolution of data captured over another continent (e.g., Europe) is at LOD 7 (e.g., 1-kilometer by 1-kilometer tiles), and there is some overlap in the coverage of the satellites. Here, combining these two large datasets to form a pyramidal precipitation map, having N levels of detail, over both continents can be a complicated process.

One approach to combining these datasets is to perform the combination before tiling any of the data (e.g., combining the raw data from all of the satellites before forming tiles). This approach, however, can be extremely resource intensive and in many cases may be unnecessary (e.g., where separate organizations have already tiled their own source data layers over separate regions).

Another approach contemplated herein is to first tile the two datasets to form a discrete source data layer of a different LOD for each dataset (e.g., a source data layer of LOD 9 over North America and a source data layer of LOD 7 over Europe). Then, both data layers are fetched from storage and stored in memory, a separate pyramid having N levels of detail is formed from each data layer, and the two separate pyramids are merged, one tile at time, to generate a merged pyramid. As used herein, the concept of merging tiles may refer to the averaging of corresponding cell values in different sources to be merged and skipping cells that have no data (e.g., null values). For a simplistic example, if a first source having a first cell with a value of 5 and a second cell with a value of 10 is merged with a second source having a first cell with a value of 9 and a second cell with a null value, then the merged tile would have a first cell with a value of 7 a second cell with a value of 10.

This approach, while possibly better than the first approach, also has disadvantages. One disadvantage is that it requires having enough memory to store all of the source tiles at once. In the alternative, large portions of the source pyramids could be stored in persistent storage and fetched as needed; however, this would create significant delays due to repeated input/output operations. A second disadvantage with this approach is that the system would generally not be able to emit completed (merged) tiles from memory to storage until after all of the source tiles are stored in memory. This creates a store and forward delay for the entire data set of merged tiles, which reduces the ability of the same system to be able to process different tiles at different stages of completion in parallel (e.g., writing some tiles while reading others).

Some embodiments of the disclosure may overcome these disadvantages by using a different approach for generating a merged data pyramid that involves performing a depth-first walk of a tree structure representing a pyramid. The tree structure begins as empty (without any merged tiles corresponding to any of the tree's nodes) and the nodes are populated (e.g., by having corresponding merged tiles generated) during the course of the depth-first walk. Specifically, on a walk down the tree structure via the edges between the nodes (e.g., at the initial visit of each node), (i) tiles in memory from source data layers having a lower LOD than the current LOD of the walk are resampled to generate tiles of higher resolution (e.g., by zooming in) and (ii) tiles from source data layers having a same LOD as the current LOD of the walk are fetched from persistent storage. Then, on the walk back up the tree structure (e.g., at the last visit of each node), (i) tiles in memory from source data layers having a higher LOD than the current LOD of the walk are resampled to generate tiles of lower resolution (e.g., by zooming out) and (ii) all of the tiles stored in memory corresponding to a given node are merged to generate a single corresponding tile of the merged pyramid. Once the merged tile is generated for the given node, source tiles corresponding to nodes that come before the given node in the walk back up the tree may be made available for deletion.

Embodiments employing this approach may offer significant advantages. One advantage is that embodiments may reduce the number of individual tiles of source data layers that need to be stored in memory at any given time when generating a merged pyramid. Another advantage to embodiments employing this approach is that they may offer better opportunities to use multithreading to perform different types of operations on different tiles at the same time. For example, one thread could be performing zooming operations on tiles corresponding to one set of nodes while at the same time another thread could be performing input/output operations on tiles corresponding to a different (or the same) set of nodes. These multithreading opportunities may rely heavily on the concept of promise objects. As used herein, the phrase promise object may refer to a programming language object that represents computations being performed in another thread and provides a way to access the results of those computations once they are completed. For example, a promise object could allow an input/output operation to proceed while a related computation is being performed on a different thread.

It should be noted that in some embodiments employing this approach, not all of the merged tiles of a given merged pyramid are formed using the described steps. For example, some nodes may be skipped (e.g., where they do not include any tiles as indicated by a coverage map) or only a subtree portion of a tree structure may be used in generating a corresponding portion of a merged pyramid, with the rest of the merged pyramid being formed using other techniques. As used herein, the term "subtree" means at least a portion of a tree including at least one parent node and all of the child nodes of that parent node (but not necessarily the siblings or grandchildren of the parent node).

Figure 2:
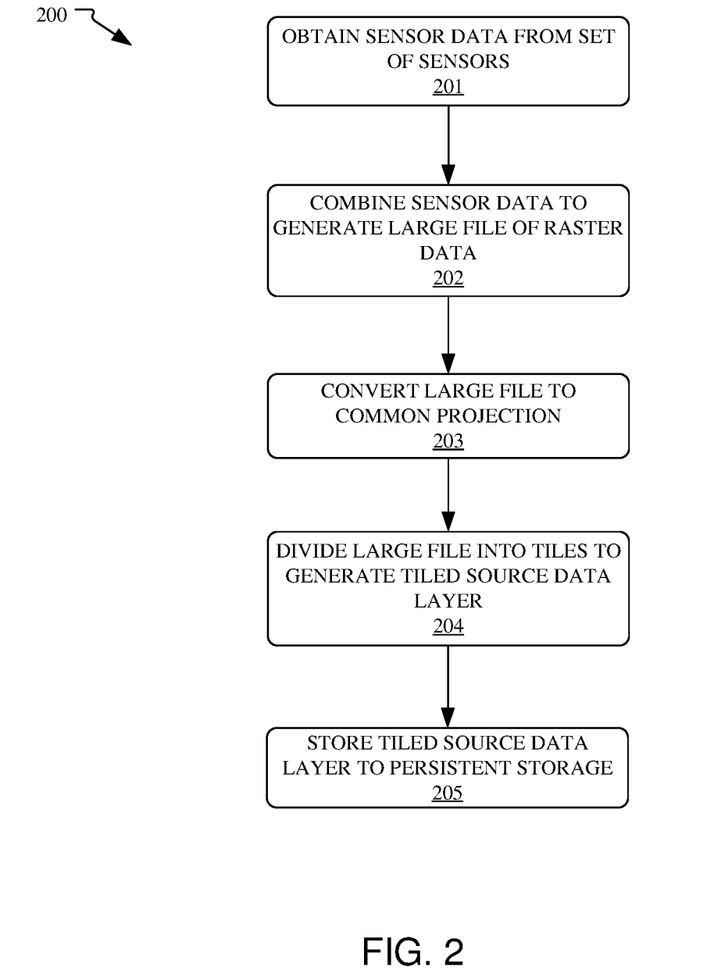
FIG. 2 illustrates a flow diagram of a method 200 for generating a tiled source data layer from sensor data, in accordance with embodiments of the present disclosure.

Referring now to FIG. 2, shown is a flow diagram of a method 200 for generating a tiled source data layer from sensor data, in accordance with embodiments. In some embodiments, operations of the method 200 may be performed by a processor of a computer (e.g., computer system 701 of FIG. 7). The method 200 begins at operation 201, wherein (raw) sensor data is obtained from a set of sensors. This may include raw data obtained from a plurality of sensors where each sensor only covers a very small portion of a larger region of interest (e.g., wind speed measurements at number of dispersed geographic locations across the United States). The sensors in the set may share common capturing or processing characteristics (e.g., they all captured data at the same native resolution). In some embodiments, the sensor data may be obtained from one or more satellites. Per operation 202, the sensor data is combined from all of the sensors in the set to generate a large file of raster data. Per operation 203, the large file is converted into a common projection. This may be particularly important in managing geographic map data, where, in order to create an accurate mapping, the data may need to have a common map projection for transforming the data obtained for the surface of the earth into a single plane. The Transverse Mercator Projection is an example map projection. Per operation 204, the large file of raster data is divided into tiles to generate a tiled source data layer. Per operation 205, the tiled source data layer is stored to persistent storage.

The operations of method 200 may be repeated multiple times such that sensor data from different sets of sensors are combined to form different, tiled source data layers having different levels of detail. For example, one set of sensors that, in combination, cover one geographic region may be used to generate a first source data layer covering that region at LOD 4 and a second set of sensors covering a different (overlapping) region may be used to generate a second source data layer covering the second region at LOD 5.

Furthermore, the operations of method 200 may be repeated for a particular set of sensors at specific time intervals (e.g., every five minutes) in order to generate a new source data layer to replace an older one that may have outdated data (e.g., weather data from an hour ago). Furthermore, in some embodiments, the operation 205 may be skipped such that source data layers undergo further processing to generate merged pyramids without first being stored to persistent storage. This may be particularly useful in certain streaming data environments.

Figure 3:
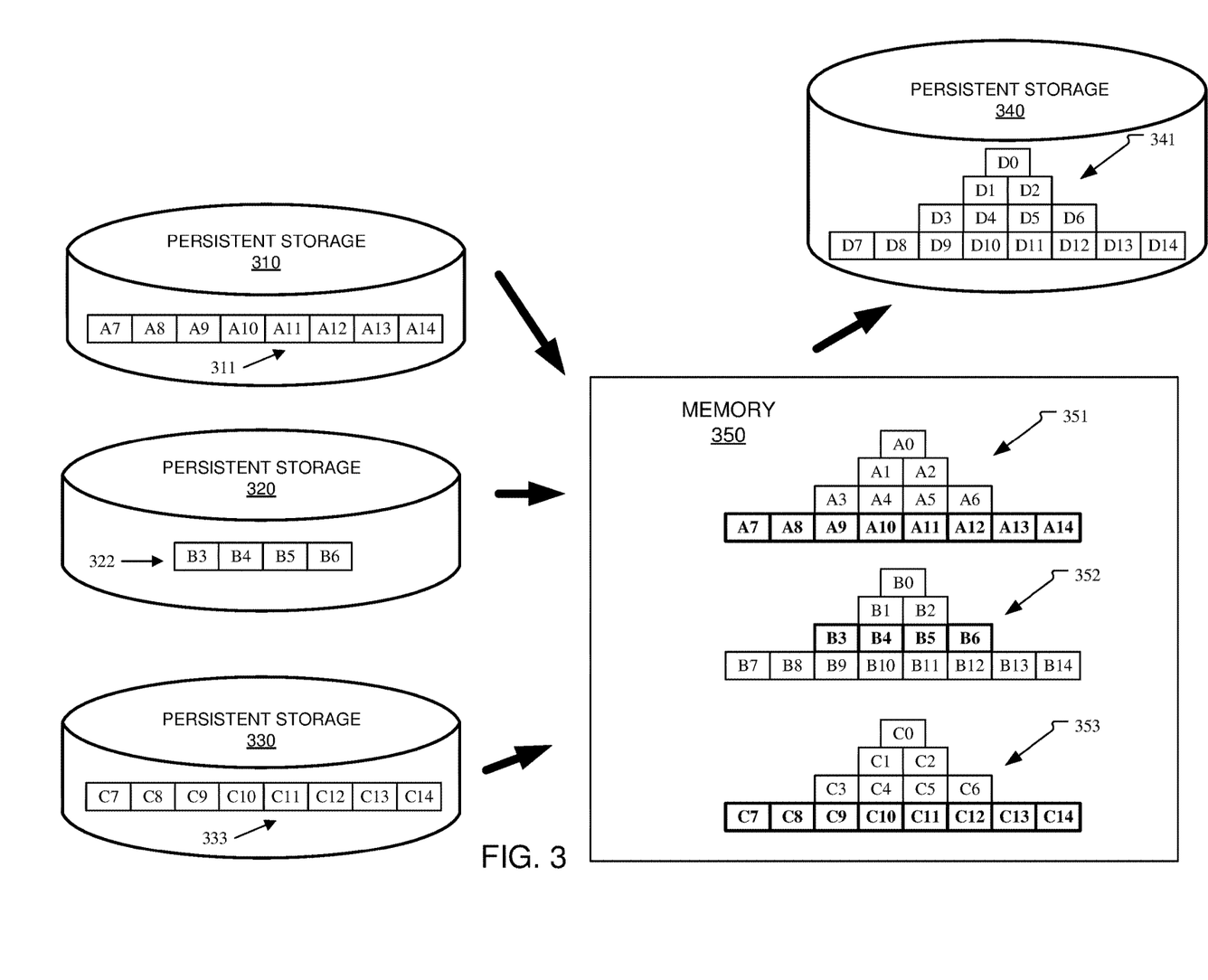
FIG. 3 illustrates a block diagram of an example approach for generating a merged pyramid 341 by first generating source-derived pyramids 351, 352, and 353, as contemplated herein.

Once multiple disparate source data layers are generated, per method 200 or otherwise, they can be combined to generate a merged data pyramid using a variety of methods. Referring now to FIG. 3, shown is a block diagram of an example approach for generating a merged pyramid 341 by first generating source-derived pyramids 351, 352, and 353, as contemplated herein. In this example, the pyramids are representable by binary tree structures such that each parent tile is zoomed in to two child tiles at the next greater LOD. For example, in merged pyramid 341 tile D0 at LOD 0 zooms in to D1 and D2 at LOD 1, and D1 zooms in to D3 and D4, and so on.

As shown, three source data layers 311, 322, and 333 are used as the basis for generating the merged data pyramid 341. The source data layers 311, 322, and 333 are depicted as being stored in persistent storage 310, 320, and 330, respectively, and merged pyramid 341 is depicted as being stored in persistent storage 340. In some embodiments, the source data layers and merged pyramid could be stored in more or fewer persistent storage locations (e.g., by storing them all in persistent storage 310).

In the approach of FIG. 3, the source data layers 311, 322, and 333 are used to generate source-derived pyramids 351, 352, and 353, respectively, which are all stored in memory 350 at the same time so that they can be merged together to generate the merged pyramid 341.

As used herein, the phrase "source-derived tile" means a tile that is generated (derived) from one or more tiles of a particular source data layer. The phrase refers to both (i) tiles that are directly derived from a particular source data layer (e.g., source-derived tile A13 of pyramid 351 is directly derived from (a copy of) tile A13 of source data layer 311, and source-derived tile B3 of pyramid 352 is directly derived from tile B3 of source data layer 322) and (ii) tiles that are indirectly derived from a tile of particular source data layer (e.g., source-derived tile A0 of pyramid 351 is indirectly derived from one or more of the tiles A7 to A14 of source data layer 311, source-derived tile B7 of pyramid 352 is indirectly derived from tile B3 of source data layer 322). Likewise, the phrase "source-derived pyramid" means a pyramid (e.g., source-derived pyramid 352) that is a combination of source-derived tiles from a single source data layer.

Furthermore, as used herein, the phrase "merged tile" means a tile that is generated from source-derived tiles from at least two different source data layers (e.g., merged tile D0 is generated from a merger of (i) source-derived tile A0, which is itself derived from tiles of source data layer 311, (ii) source-derived tile B0, which is itself derived from tiles of source data layer 322, and (ii) source-derived tile C0, which is itself derived from tiles of source data layer 333). Moreover, this means that "source-derived tiles" and "merged tiles" are mutually exclusive concepts such that one tile cannot be both a source-derived tile and merged tile. This is true because the merger that generates a merged tile means that it is no longer derived from a particular source data layer.

Continuing a review of the merger approach of FIG. 3, it is clear that this approach requires a significant amount of memory 350. Specifically, forty-two source-derived tiles (all of the tiles of pyramids 351, 352, and 353) are in memory 350 at the same time for the generation of pyramid 341. Likewise, it also clear that this approach significantly limits the amount of parallel processing that can occur.

Figure 4:
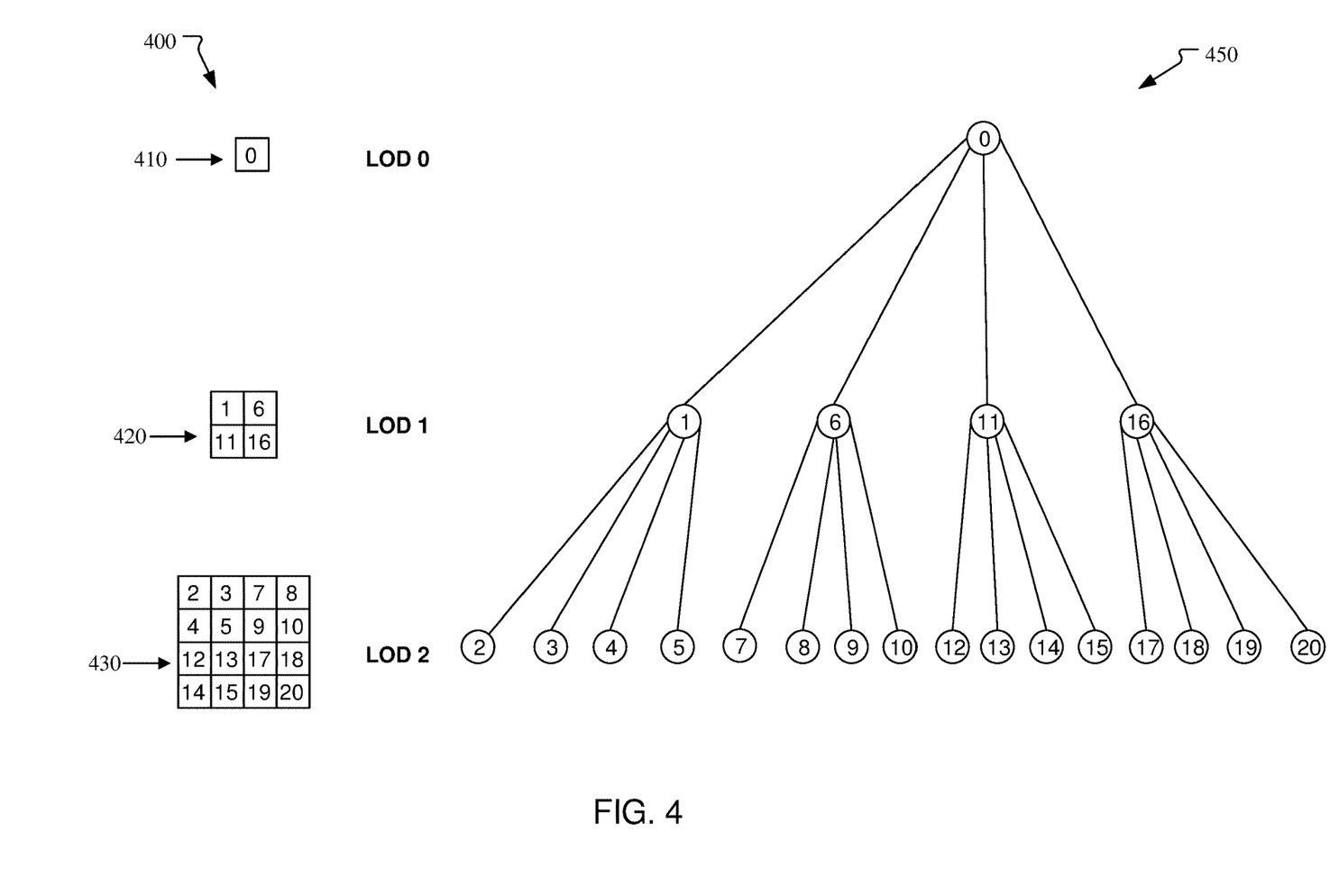
FIG. 4 illustrates a block diagram of an example pyramid 400 and a corresponding tree structure 450 that is representative of the pyramid 400, in accordance with embodiments of the present disclosure.

Referring now to FIG. 4, shown is a block diagram of an example pyramid 400 and a corresponding tree structure 450 that is representative of the pyramid 400, in accordance with embodiments. As shown, the pyramid 400 has three data layers 410, 420, and 430 at levels of detail 0, 1, and 2, respectively. The corresponding tree structure 450 is a quadtree data structure, wherein each tile in the pyramid 400 is represented by a node in the tree. The edges between the nodes represent possible traversal paths between the nodes. In embodiments where the tree structure 450 is used in the generation of the pyramid 400, it begins as an empty tree structure and is populated with merged tiles of the pyramid 400 as they are generated.

As shown, the nodes are numbered based on their first visit orders in terms of an example depth-first walk that begins at the root node and traverses the nodes in a left to right manner. The complete traversal order of this walk is as follows: 0, 1, 2, 1, 3, 1, 4, 1, 5, 1, 0, 6, 7, 6, 8, 6, 9, 6, 10, 6, 0, 11, 12, 11, 13, 11, 14, 11, 15, 11, 0, 16, 17, 16, 18, 16, 19, 16, 20, 16, 0.

It should be noted that other types of depth-first walks are also contemplated in embodiments. For example, in the nodes could be traversed in right to left manner or in various other repeated travel orders.

Figure 5:
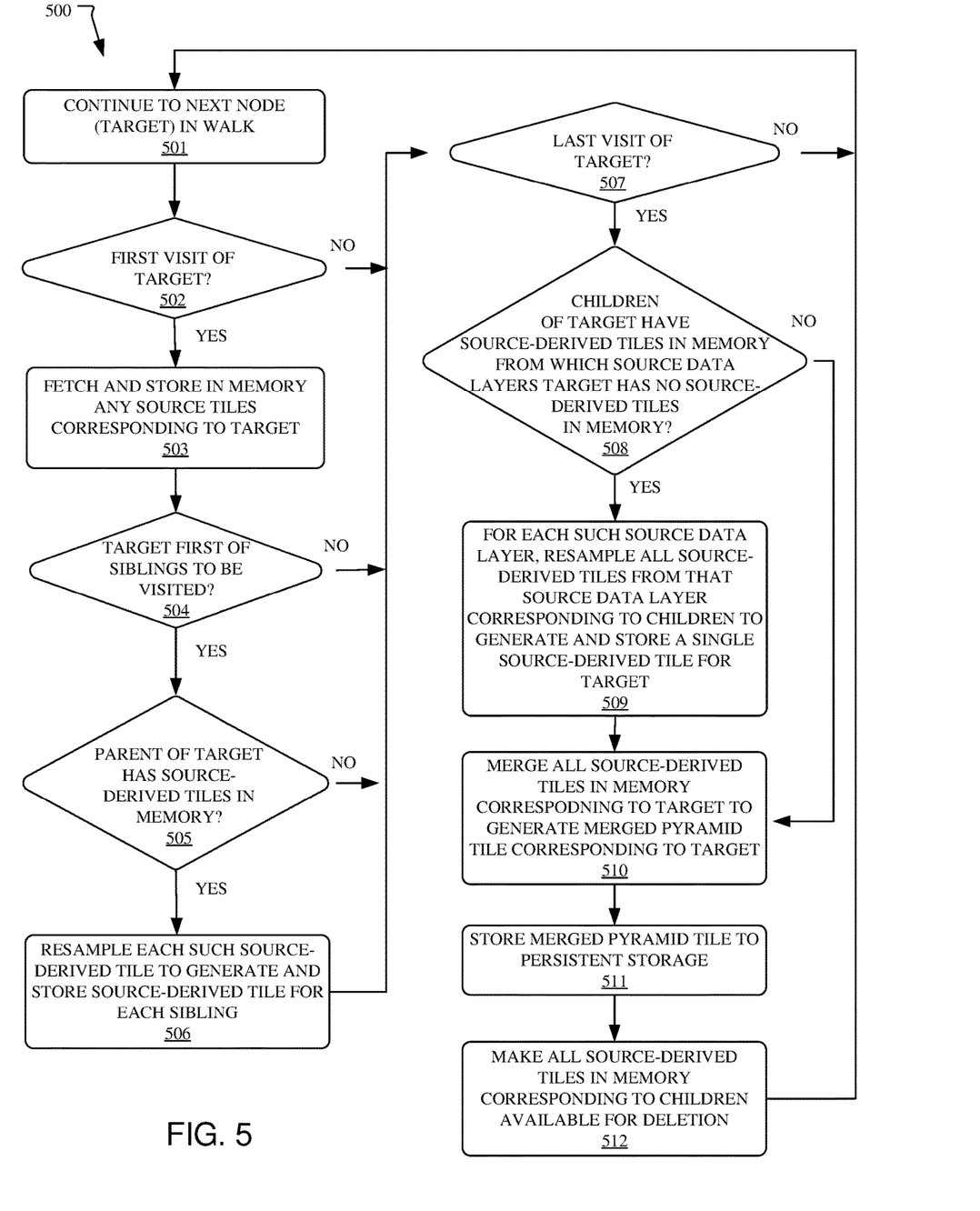
FIG. 5 illustrates a flow diagram of a method 500 for using a depth-first walk in generating a merged pyramid from a plurality of source data layers, in accordance with embodiments of the present disclosure.

Referring now to FIG. 5, shown is a flow diagram of a method 500 for using a depth-first walk in generating a merged pyramid from a plurality of source data layers in accordance with embodiments. In some embodiments, operations of the method 500 may be performed by a processor of a computer (e.g., computer system 701 of FIG. 7). Each iteration of the method 500 begins at operation 501, wherein the traversal moves to a next node (referred to as a "target node" in the context of FIG. 5) in the depth-first walk of a tree structure (e.g., quadtree data structure 450 of FIG. 4). In the first iteration of the method, the traversal may begin at the root node of an empty tree structure. However, in some embodiments, other starting nodes are contemplated. As the method 500 progresses, the nodes of the tree structure are populated with corresponding merged tiles of the merged data pyramid.

Per operation 502, a determination is made as to whether this visit of the current target node is a first in order (initial) visit of that node in the depth-first walk. If not, then the method proceeds to operation 507. If it is the first visit of the target node, then the method proceeds to operation 503, wherein any source tiles corresponding to the target node are fetched (from persistent storage) and stored in memory. Next, per operation 504, a determination is made as to whether the target node is the first node of a set of sibling nodes to be visited during the walk. If not, then the method proceeds to operation 507. If the target node is the first of the siblings to be visited in the walk, then the method proceeds to operation 505, wherein a determination is made as to whether the parent node of the target node has any source-derived tiles stored in memory. If not, then the method proceeds to operation 507. If the parent node of the current target node does have any source-derived tiles stored in memory, then the method proceeds to operation 506, wherein each one of the source-derived tiles identified in operation 505 is resampled so as to generate a source-derived tile for each sibling in the set of siblings (of the target node). For example, if three source-derived tiles are identified for a particular parent node in operation 505, then the three tiles are resampled separately to generate a total of three new source-derived tiles for each child node of the parent node (including the target node itself). These new source-derived tiles are stored in memory. In some embodiments, the resampling of operation 506 involves effectively zooming in on a parent tile to generate the child tiles at a higher level of detail than the parent tile. This zooming in may be by a factor of two and a variety of cell interpolation methods may be used (e.g., bicubic, bilinear, or nearest neighbor).

Once operation 506 is completed, or a "no" determination is made in any of operations 502, 504, or 505, the method proceeds to operation 507, wherein a determination is made as to whether the current visit of the target node is a last visit of that node in the depth-first walk. If, per operation 507, it is determined that the current visit is a last in order visit of the target node, then the method 500 loops back to operation 501 to start another iteration by continuing the walk to the next node in order (i.e., the new "target node"). If, however, a determination is made that this is the last visit of the current target node, then the method proceeds to operation 508.

Per operation 508, a determination is made as to whether any of the children nodes of the target node (if the target node has any children nodes at all) have any source-derived tiles stored in memory from which source data layers the target node does not have any source-derived tiles currently stored in memory. If there are no such children nodes, then the method skips to operation 510. If, however, there are any such children nodes of the target node, then, per operation 509, for each such source data layer, all of the children's source-derived tiles identified in operation 508 from that source data layer are resampled so as to generate a single source-derived tile corresponding to the target node. For example, if there are two children nodes of the target node and each child node has one source-derived tile from source data layer X and one source-derived tile from source data layer Y identified in operation 508, then the two source-derived tiles from source X are resampled together to generate a first, new single source-derived tile for the target node and the two source-derived tiles from source Y are resampled tougher to generate a second, new single source-derived tile for the target node. These new source-derived tiles are stored in memory. In some embodiments, the resampling of operation 509 involves effectively zooming out on a group of children tiles to form a parent tile having a lower level of detail than the child tiles.

After operation 509 is completed or a "no" determination is made in operation 508, the method proceeds to operation 510, wherein all of the source-derived tiles currently stored in memory corresponding to the target node are merged so as to generate a single merged tile corresponding to the target node. Per operation 511, the new merged tile is stored to persistent storage. Per operation 512, all of the source-derived tiles in memory corresponding to the children of the target node are made available for deletion. This may involve actually deleting those tiles, making those tiles available for garbage collection, etc. In some embodiments, operation 512 may occur periodically or at set intervals after multiple merged tiles have been generated for multiple nodes. That is to say, child source-derived tiles may be stored in memory for a time as target nodes are processed, so as to allow for these tiles to be made available for deletion in larger, bulk groups.

Once operation 512 is completed, the method loops back to start another iteration by continuing the walk to the next node in order (i.e., the new "target node"). In some embodiments, these iterations continue until all of the merged tiles have been generated and the walk ends at the root node.

Many other variants on method 500 are also contemplated in embodiments. For example, in some embodiments a coverage map (e.g., a coverage index or a similar data structure) is used to track which source data layers have null or missing tiles (and/or source-derived tiles) at certain locations. These null tiles may occur in instances where there is no data for various portions of a region of interest (e.g., in source data layer having precipitation data for the United States, there could be a null tile over a remote region of Michigan's Upper Peninsula where there are no weather sensors in the area). By using the coverage map, the system may be able to quickly confirm where there will be no tiles so as to avoid the need to perform more costly checks of individual tiles only to find that they are null. Once a null tile is located in the coverage map, it is skipped over in operations of the method 500 (e.g., operation 501).

Further, in other variants of the method 500, the operations may only be performed on some, but less than all, of the nodes of a tree structure representing the corresponding merged pyramid. This may include for example, situations where only a subtree of the tree structure is processed according the method 500.

In other variants on the method 500, it may be useful to know efficiently the visit order (e.g., first visit order or last visit order) of nodes in the depth-first walk. This can be valuable, for example, in variants of operation 512 where source-derived tiles that are no longer needed are deleted from memory periodically. It can also be valuable in finding out which source tile is the next one that needs to be fetched from storage (e.g., in operation 501). One method of efficiently making ordering determinations is by defining a "comes_before ( )" function that specifies the order of the visiting of nodes by comparing corresponding source-derived tiles. For example, the comes_before function can take the addresses of two different source-derived tiles stored in memory as its inputs, and then output "true" if the first tile is ordered before the second tile in the depth-first walk. In embodiments where nodes are arranged in quadtree structure, a Morton order is used in the comes_before function, particularly for tiles (nodes) of the same LOD. For comparing (source-derived) tiles at different levels of detail, a determination is first made as to where (e.g., what address) the ancestor of the tile at the greater LOD is located in the same layer of the tile at the lesser LOD. Then the Morton order is used. Where there is a tie in the Morton order, the tile with the lesser LOD will be determined to be the tile that is encountered before the other tile in the depth-first walk.

Figure 6:
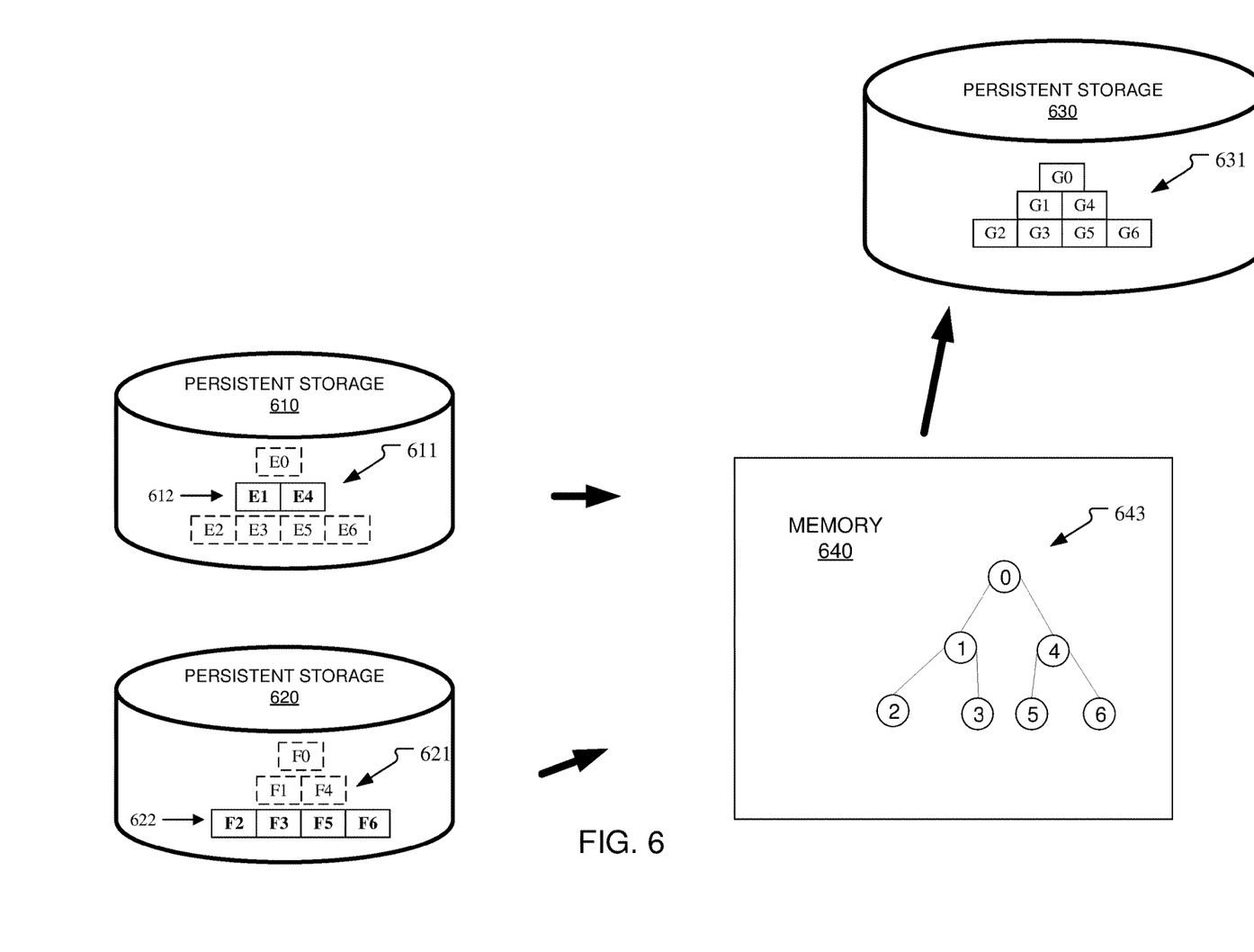
FIG. 6 illustrates a block diagram of an example approach for using method 500 to generate a merged pyramid 631 from a plurality of source data layers 612 and 622, in accordance with embodiments of the present disclosure.

Referring now to FIG. 6, shown is a block diagram of an example approach for using method 500 to generate a merged pyramid 631 from a plurality of source data layers 612 and 622, in accordance with embodiments. In this example (and similar to the example referenced in FIG. 2), the pyramids are representable by binary tree structures such that each parent tile is zoomed in to two child tiles at the next greater LOD. For example, in merged pyramid 631 tile G0 at LOD 0 zooms in to G1 and G4 at LOD 1, and G1 zooms in to G2 and G3, and so on. Several of the tiles are shown in dashed lines in persistent storage (e.g., E2 and F1). This represents the fact that while these tiles are ultimately generated and stored in memory 640 during the generation of merged pyramid 641 in this example, they only need to be maintained in the memory for a short period of time before being deleted, and the entire source-derived pyramids 611 and 621 are never fully formed (in memory or storage).

The example of FIG. 6 begins at the root node 0 for a depth-first walk of the tree structure 643 representing the (yet to be generated) merged pyramid 631 (operation 501). This is the first visit of node 0 (operation 502), so a check is made to determine if there are any source tiles in persistent storage 610 or 620 (for pyramids 611 and 621, respectively) at the address X=0, Y=0, LOD=0. There are no such tiles in storage, because both E0 and F0 are empty, so no tiles are fetched (operation 503). Node 0 is the first of a set of siblings to be visited (operation 504) but does not have a parent node (operation 505) and this is not the last visit of node 0 (operation 507), so the method proceeds to the next node in the walk of the tree structure 643 (operation 501), which is node 1. In some situations, a comes_before function can be used to determine that node 1 is the next node in the walk.

This is the first visit of node 1 (operation 502), so a check is made to determine if there are any source tiles in persistent storage 610 or 620 at the address X=0, Y=0, LOD=1. There is such a tile in storage, because E1 exists in source data layer 612, so tile E1 is fetched and stored in memory 640 as a source-derived tile (operation 503). Node 1 is the first of a set of siblings to be visited (operation 504), but its parent node 0 does not have any source-derived tiles stored in memory (operation 505). This is not the last visit of node 1 (operation 507), so the method proceeds to the next node in the walk of the tree structure 643 (operation 501), which is node 2.

This is the first visit of node 2 (operation 502), so a check is made to determine if there are any source tiles in persistent storage 610 or 620 at the address X=0, Y=0, LOD=2. There is such a tile in storage, because F2 exists in source data layer 622, so tile F2 is fetched and stored in memory 640 as a source-derived tile (operation 503). Node 2 is the first of a set of siblings to be visited (operation 504), and its parent node 1 does have a source-derived tile E1 stored in memory (operation 505), so the source-derived tile E1 is resampled (e.g., zoomed in) to generate and store in memory 640 source-derived tiles E2 and E3 (operation 506). Also, this is the last visit of node 2 (operation 507). But it does not have any children nodes (operation 508), so the source-derived tiles stored in memory 640 corresponding to node 2, which are E2 and F2, are merged to generate merged tile G2 (operation 510), which is stored to persistent storage 630 (operation 511). As discussed above, node 2 does not have any children nodes (operation 512), so the method proceeds to the next node in the walk of the tree structure 643 (operation 501), which is node 1. However, this is neither the first visit (operation 502), nor the last visit (operation 507), of node 1, so the method proceeds to the next node in the walk of the tree structure 643 (operation 501), which is node 3.

This is the first visit of node 3 (operation 502), so a check is made to determine if there are any source tiles in persistent storage 610 or 620 at the address X=1, Y=0, LOD=2. There is such a tile in storage, because F3 exists in source data layer 622, so tile F3 is fetched and stored in memory 640 as a source-derived tile (operation 503). Node 3 is not the first of a set of siblings to be visited (operation 504), and this is the last visit of node 3 (operation 507), but it does not have any children nodes (operation 508), so the source-derived tiles stored in memory 640 corresponding to node 3, which are E3 and F3, are merged to generate merged tile G3 (operation 510), which is stored to persistent storage 630 (operation 511). As discussed above, node 3 does not have any children nodes (operation 512), so the method proceeds to the next node in the walk of the tree structure 643 (operation 501), which is node 1.

This is the last visit of node 1 (operation 507) and node 1 does have children nodes, which are nodes 2 and 3, that have source-derived tiles from source data layer 622 from which node 1 does not have any corresponding source derived tiles (operation 508). So, tiles F2 and F3 are resampled together (e.g., zoomed out) to generate, and store in memory 640, a source-derived tile F1 (operation 509). Next the source-derived tiles stored in memory 640 corresponding to node 1, which are E1 and F1, are merged to generate merged tile G1 (operation 510), which is stored to persistent storage 630 (operation 511). The source-derived tiles corresponding to node 1's children nodes, which are tiles E2, E3, F2, and F3, are made available for deletion (operation 512). The method proceeds to the next node in the walk of the tree structure 643 (operation 501), which is node 0. However, this is neither the first visit (operation 502), nor the last visit (operation 507), of node 0, so the method proceeds to the next node in the walk of the tree structure 643 (operation 501), which is node 4.

This is the first visit of node 4 (operation 502), so a check is made to determine if there are any source tiles in persistent storage 610 or 620 at the address X=1, Y=0, LOD=1. There is such a tile in storage, because E4 exists in source data layer 612, so tile E4 is fetched and stored in memory 640 as a source-derived tile (operation 503). Node 4 is the first of a set of siblings to be visited (operation 504), but its parent node 0 does not have any source-derived tiles stored in memory (operation 505). This is not the last visit of node 4 (operation 507), so the method proceeds to the next node in the walk of the tree structure 643 (operation 501), which is node 5.

This is the first visit of node 5 (operation 502), so a check is made to determine if there are any source tiles in persistent storage 610 or 620 at the address X=2, Y=0, LOD=2. There is such a tile in storage, because F5 exists in source data layer 622, so tile F5 is fetched and stored in memory 640 as a source-derived tile (operation 503). Node 5 is the first of a set of siblings to be visited (operation 504), and its parent node 4 does have a source-derived tile E4 stored in memory (operation 505), so the source-derived tile E4 is resampled (e.g., zoomed in) to generate and store in memory 640 source-derived tiles E5 and E6 (operation 506). Also, this is the last visit of node 5 (operation 507), but it does not have any children nodes (operation 508), so the source-derived tiles stored in memory 640 corresponding to node 5, which are E5 and F5, are merged to generate merged tile G5 (operation 510), which is stored to persistent storage 630 (operation 511). As discussed above, node 5 does not have any children nodes (operation 512), so the method proceeds to the next node in the walk of the tree structure 643 (operation 501), which is node 4. However, this neither the first visit (operation 502), nor the last visit (operation 507), of node 4, so the method proceeds to the next node in the walk of the tree structure 643 (operation 501), which is node 6.

This is the first visit of node 6 (operation 502), so a check is made to determine if there are any source tiles in persistent storage 610 or 620 at the address X=3, Y=0, LOD=2. There is such a tile in storage, because F6 exists in source data layer 622, so tile F6 is fetched and stored in memory 640 as a source-derived tile (operation 503). Node 6 is not the first of a set of siblings to be visited (operation 504). This is the last visit of node 6 (operation 507), but it does not have any children nodes (operation 508), so the source-derived tiles stored in memory 640 corresponding to node 6, which are E6 and F6, are merged to generate merged tile G6 (operation 510), which is stored to persistent storage 630 (operation 511). As discussed above, node 6 does not have any children nodes (operation 512), so the method proceeds to the next node in the walk of the tree structure 643 (operation 501), which is node 4.

This is the last visit of node 4 (operation 507) and node 4 does have children nodes, which are nodes 5 and 6, that have source-derived tiles from source data layer 622 from which node 4 does not have any corresponding source derived tiles (operation 508). So, tiles F5 and F6 are resampled together (e.g., zoomed out) to generate, and store in memory 640, a source-derived tile F4 (operation 509). Next, the source-derived tiles stored in memory 640 corresponding to node 4, which are E4 and F4, are merged to generate merged tile G4 (operation 510), which is stored to persistent storage 630 (operation 511). The source-derived tiles corresponding to node 4's children nodes, which are tiles E5, E6, F5, and F6, are made available for deletion (operation 512). The method proceeds to the next node in the walk of the tree structure 643 (operation 501), which is node 0.

This is the last visit of node 0 (operation 507), and node 0 does have children nodes (which are nodes 1 and 4) that have source-derived tiles (from source data layers 612 and 622) from which node 0 does not have any corresponding source derived tiles (operation 508). So, tiles F1 and F4 are resampled together (e.g., zoomed out) to generate, and store in memory 640, a source-derived tile F0, and tiles E1 and E4 are resampled together (e.g., zoomed out) to generate, and store in memory 640, a source-derived tile E0 (operation 509). Next the source-derived tiles stored in memory 640 corresponding to node 0, which are E0 and F0, are merged to generate merged tile G0 (operation 510), which is stored to persistent storage 630 (operation 511). The source-derived tiles corresponding to node 0's children nodes, which are tiles E1, E4, F1, and F4, are made available for deletion (operation 512). In addition, because the node 0 is the root node, source-derived tiles E0 and F0 are also made available for deletion. At this point the entire merged pyramid 631 has been generated and stored in persistent storage 630.

In a variant on this description of FIG. 6, a comes_before function could be used to bulk delete source-derived tiles from memory 640 periodically after are no longer needed. For example, at the last visit of node 4 embodiments of the function would indicate that tiles E2, E3, E5, E6, F2, F3, F5, and F6 can be deleted.

Contrasting the merged pyramid generation approach of FIG. 6 with the corresponding approach of FIG. 3 reveals significant potential advantages of the former approach over the latter. For example, the approach of FIG. 3 requires significantly more memory.

Some embodiments of the present disclosure may offer various technical computing advantages over other approaches. These computing advantages address problems arising in the realm of merged pyramid generation and the associated problems of computer performance and efficiency, particularly as they relate to reducing the processing cycles, memory, and/or time involved in generating the merged pyramid. Implementation of embodiments of the methods described herein can result in improved system performance and technical computing advantages. As evidence of these advantages, an experiment was conducted in which an algorithm according to embodiments was compared to another approach, which acted as a control. The same processing and memory limits were applied to both the test and control groups. In both groups, ten source data layers (one at LOD 9 and nine at LOD 7) were merged to generate a merged pyramid of LOD 9. Repeated testing showed that the control group took about 3.5 to 5 minutes to complete the merged pyramid generation. The test group that used an algorithm in accordance with embodiments took about 1.3 minutes on average to complete the merged pyramid generation, which represented about a 62.8-74% improvement in speed over the control group.

Figure 7:
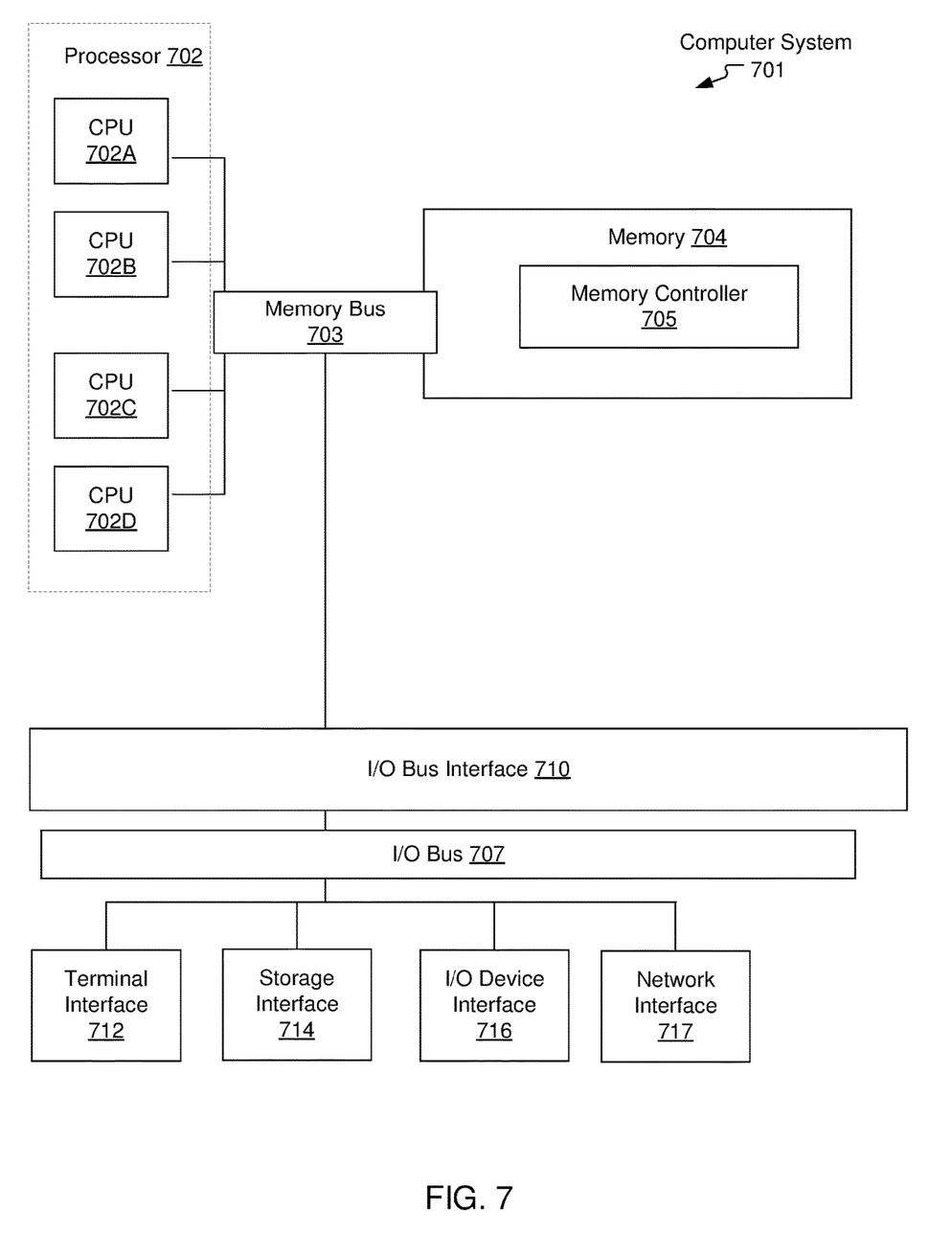
FIG. 7 illustrates a high-level block diagram of an example computer system that may be used in implementing embodiments of the present disclosure.

Referring now to FIG. 7, shown is a high-level block diagram of an example computer system (i.e., computer) 701 that may be used in implementing one or more of the methods or modules, and any related functions or operations, described herein (e.g., using one or more processor circuits or computer processors of the computer), in accordance with embodiments of the present disclosure. In some embodiments, the major components of the computer system 701 may comprise one or more CPUs 702, a memory subsystem 704, a terminal interface 712, a storage interface 714, an I/O (Input/Output) device interface 716, and a network interface 717, all of which may be communicatively coupled, directly or indirectly, for inter-component communication via a memory bus 703, an I/O bus 707, and an I/O bus interface unit 710.

The computer system 701 may contain one or more general-purpose programmable central processing units (CPUs) 702A, 702B, 702C, and 702D, herein generically referred to as the processer 702. In some embodiments, the computer system 701 may contain multiple processors typical of a relatively large system; however, in other embodiments the computer system 701 may alternatively be a single CPU system. Each CPU 702 may execute instructions stored in the memory subsystem 704 and may comprise one or more levels of on-board cache.

In some embodiments, the memory subsystem 704 may comprise a random-access semiconductor memory, storage device, or storage medium (either volatile or non-volatile) for storing data and programs. In some embodiments, the memory subsystem 704 may represent the entire virtual memory of the computer system 701, and may also include the virtual memory of other computer systems coupled to the computer system 701 or connected via a network. The memory subsystem 704 may be conceptually a single monolithic entity, but, in some embodiments, the memory subsystem 704 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. In some embodiments, the main memory or memory subsystem 704 may contain elements for control and flow of memory used by the Processor 702. This may include a memory controller 705.

Although the memory bus 703 is shown in FIG. 7 as a single bus structure providing a direct communication path among the CPUs 702, the memory subsystem 704, and the I/O bus interface 710, the memory bus 703 may, in some embodiments, comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 710 and the I/O bus 707 are shown as single respective units, the computer system 701 may, in some embodiments, contain multiple I/O bus interface units 710, multiple I/O buses 707, or both. Further, while multiple I/O interface units are shown, which separate the I/O bus 707 from various communications paths running to the various I/O devices, in other embodiments some or all of the I/O devices may be connected directly to one or more system I/O buses.

In some embodiments, the computer system 701 may be a multi-user mainframe computer system, a single-user system, or a server computer or similar device that has little or no direct user interface, but receives requests from other computer systems (clients). Further, in some embodiments, the computer system 701 may be implemented as a desktop computer, portable computer, laptop or notebook computer, tablet computer, pocket computer, telephone, smart phone, mobile device, or any other appropriate type of electronic device.

It is noted that FIG. 7 is intended to depict the representative major components of an exemplary computer system 701. In some embodiments, however, individual components may have greater or lesser complexity than as represented in FIG. 7, components other than or in addition to those shown in FIG. 7 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As used herein, the term "each" does not necessarily equate to the term "all" as the term "all" is used colloquially. For example, the following two phrases have different meanings: "a car having a plurality of tires, each tire of the plurality of tires being fully inflated" and "a car that has all of its tires fully inflated". The former phrase would encompass a car with three fully-inflated tires (the plurality of tires) and one flat tire (not included in the plurality of tires). The latter phrase would not encompass such a car (because not all of the car's tires are fully inflated). Likewise, the phrase "a computer having a set of files, each file of the set of files being read-only" would encompass a computer having two files, one of which is read-only (and belongs to the set of files) and one of which is not read-only (and does not belong to the set of files).

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the invention.

What is claimed is:

1. A method comprising:
   performing a depth-first walk of an empty tree structure to populate a plurality of nodes of the tree structure with corresponding merged tiles of a merged data pyramid to be generated during the walk from source tiles of source data layers,
   wherein at a first in order visit of a target node of the plurality of nodes of the tree structure during the walk:
      a source tile from a first source data layer corresponding to the target node is fetched and stored in memory as a first source-derived tile corresponding to the target node; and
   wherein at a last visit of the target node during the walk:
      a resampling on source-derived tiles from a second source data layer stored in memory corresponding to children nodes of the target node is performed to generate and store in memory a second source-derived tile corresponding to the target node, wherein the first and second source data layers are generated from different source data; and
      at least the first and second source-derived tiles are merged to generate a merged tile of the merged data pyramid corresponding to the target node.

2. The method of claim 1, wherein, at the last visit of the target node during the walk, the first and second source-derived tiles are made available for deletion.

3. The method of claim 1, wherein the first and second source data layers are generated from different source data captured by different sets of sensors from each other.

4. The method of claim 1, wherein, at the first in order visit of the target node during the walk, because the target node is the only one of a set of sibling nodes that has been visited so far during the walk and a parent node of the target node has a corresponding source-derived tile from a third source data layer stored in memory, a resampling on the source-derived tile corresponding to the parent node is performed to generate and store in memory a third source-derived tile corresponding to the target node.

5. The method of claim 4, wherein at least the first and second source-derived tiles being merged to generate the merged tile of the merged data pyramid corresponding to the target node comprises at least the first, second, and third source-derived tiles being merged.

6. The method of claim 1, wherein a coverage map is used to identify null tiles in source data layers that can be skipped during the depth-first walk.

7. The method of claim 1, wherein the tree structure is a quadtree.

8. The method of claim 1, wherein the tree structure is a binary tree.

9. A computer program product for generating a merged data pyramid from a plurality of tiled source data layers, the computer program product comprising a computer readable storage medium, wherein the computer readable storage medium is not a transitory signal per se, the computer readable storage medium having program instructions embodied therewith, the programs instructions configured, when executed by at least one computer, to cause the at least one computer to perform a method comprising:
   performing a depth-first walk of an empty tree structure to populate a plurality of nodes of the tree structure by generating a plurality of tiles of the merged data pyramid corresponding to the plurality of nodes,
   wherein at a first visit of at least each node of a subtree of the tree structure during the walk:
      any tiles in the source data layers corresponding to that node are fetched and stored in memory, wherein the source data layers are each generated from different source data captured by a different set of sensors; and
      if that node is the only one of a set of sibling nodes that has been visited so far during the walk and a parent node of that node has at least one corresponding source-derived tile stored in memory, then a resampling on each such source-derived tile corresponding to the parent node is performed to generate and store in memory a source-derived tile of higher resolution corresponding to each node in the set of siblings; and
   wherein at a last visit of the at least each node of the subtree during the walk:

for each source data layer from which (i) any children nodes of that node have corresponding source-derived tiles stored in memory and from which (ii) that node does not have a corresponding source-derived tile stored in memory, a resampling on those source-derived tiles from that source data layer corresponding to those children nodes is performed to generate and store and in memory a single source-derived tile of lower resolution from that source data layer corresponding to that node;

all of the source-derived tiles stored in memory corresponding to that node are merged to generate a tile of the merged data pyramid corresponding to that node; and all of the source-derived tiles stored in memory corresponding to the children nodes of that node are made available for deletion from memory.

10. The computer program product of claim 9, wherein the subtree of the tree structure comprises the entire tree structure.

11. The computer program product of claim 9, wherein the subtree of the tree structure comprises at least all of the nodes in at least two levels of detail of the tree structure, wherein at least one of the levels of detail is at level of detail 3 or greater.

12. The computer program product of claim 9, wherein a coverage map is used to identify null tiles in source data layers that can be skipped during the depth-first walk.

13. The computer program product of claim 9, wherein the tree structure is a quadtree.

14. The computer program product of claim 9, wherein the tree structure is a binary tree.

15. A system comprising:

a computer readable storage medium; and a processor in communication with the computer readable storage medium, the processor configured to obtain instructions from the computer readable storage medium that cause the processor to perform a method comprising:

performing a depth-first walk of a tree structure in which a plurality of nodes of the tree structure represent merged tiles of a merged data pyramid to be generated during the walk from source tiles of source data layers, wherein at a first in order visit of a target node of the tree structure during the walk:

a source tile from a first source data layer corresponding to the target node is fetched and stored in memory as a first source-derived tile corresponding to the target node; and a zoom-in on a source-derived tile from a second source data layer stored in memory corresponding to a parent node of the target node is performed to generate and store in memory a second source-derived tile corresponding to the target node; and wherein at a last visit of the target node during the walk:

a zoom-out on source-derived tiles from a third source data layer stored in memory corresponding to children nodes of the target node is performed to generate and store and in memory a third source-derived tile corresponding to the target node, wherein the first, second, and third source data layers are generated from different source data from each other; and at least the first, second, and third source-derived tiles are merged to generate a merged tile of the merged data pyramid corresponding to the target node.

16. The system of claim 15, wherein a coverage map is used to identify null tiles in source data layers that can be skipped during the depth-first walk.

17. The system of claim 15, wherein the tree structure is a quadtree.

18. The system of claim 15, wherein the tree structure is a binary tree.

19. The system of claim 15, wherein, at the last visit of the target node during the walk, the source-derived tiles stored in memory corresponding to the children node are made available for deletion from memory.

* * * * *